United States Patent
Baron (10) Patent No.: US 7,027,662 B2
(45) Date of Patent: Apr. 11, 2006

(54) METHOD AND APPARATUS FOR THE REMOVAL OF FLASH ARTIFACTS

(75) Inventor: John M. Baron, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/011,412

(22) Filed: Dec. 13, 2004

(65) Prior Publication Data

US 2005/0094895 A1    May 5, 2005

Related U.S. Application Data

(62) Division of application No. 09/834,238, filed on Apr. 11, 2001, now Pat. No. 6,859,565.

(51) Int. Cl.
*G06K 9/40* (2006.01)
*H04N 9/73* (2006.01)

(52) U.S. Cl. .................................. 382/275; 348/223.1

(58) Field of Classification Search ................ 382/162, 382/167, 254–255, 269, 274, 275, 276; 348/223.1, 348/224.1, 371, 576; 396/61, 158, 176, 179, 396/155

See application file for complete search history.

(56) References Cited

U.S. PATENT DOCUMENTS 5,568,194 A * 10/1996 Abe ......................... 348/223.1
6,798,903 B1 * 9/2004 Takaoka ..................... 382/167

* cited by examiner

*Primary Examiner*—Kanjibhai Patel
(74) *Attorney, Agent, or Firm*—Leslie P. Gehman (57) ABSTRACT

An image without use of a flash is taken, along with an image using a flash. A difference image is generated by subtracting the flash-less image from the flash image. A threshold is applied to the difference image such that only large differences in intensity remain in the difference image. This artifact image is then subtracted from the flash image, thereby removing flash artifacts such as specular reflections and red-eye. The threshold used may be automatically calculated or may be set by the user. For some applications it may be desirable to set separate thresholds for each dimension of the color space (such as red, green, and blue) used. Once again these separate thresholds may be automatically calculated or may be set by the user.

13 Claims, 8 Drawing Sheets

METHOD AND APPARATUS FOR THE REMOVAL OF FLASH ARTIFACTS

CROSS-REFERENCE TO RELATED APPLICATIONS

This application is a divisional of application Ser. No. 09/834,238 also entitled, "Method and Apparatus for the Removal of Flash Artifacts," filed on Apr. 11, 2001, now issued as U.S. Pat. No. 6,859,565 hereby incorporated herein by reference.

FIELD OF THE INVENTION

The present invention relates to the field of photography, and more particularly, to the field of flash photography.

BACKGROUND OF THE INVENTION

In the early days of photography, when people sat to have their portraits taken indoors, exposure times ranged up to ten minutes due to the slow speed of the photographic plates and the typically low light levels indoors. Often, the subjects of the photograph were subjected to being mechanically clamped in place to prevent movement during the exposure. With the advent of artificial lighting, initially the burning of magnesium powder, exposure times were shortened dramatically. Today, many cameras have a flash built-in, allowing users to take flash photographs at any opportunity.

However, the use of a flash does have its drawbacks. When the flash is positioned near the lens of the camera, the eyes of a human subject tend to glow red in the resulting photo. This problem is so common that many photography shops sell special pens used to remove the red-eye from the finished photo. Also, animals' eyes tend to glow similarly, but with different colors. Further, the flash photography of reflective objects may result in very bright specular reflections from the objects, thus detracting from the resulting photograph. There is a need in the art for a method and an apparatus to remove or modify these flash artifacts automatically.

SUMMARY OF THE INVENTION

An image without use of a flash is taken, along with an image using a flash. A difference image is generated by subtracting the flash-less image from the flashed image. A threshold is applied to the difference image such that only large differences in intensity remain in the difference image. This artifact image is then subtracted from the flash image, thereby removing flash artifacts such as specular reflections and red-eye. The threshold used may be automatically calculated or may be set by the user. For some applications it may be desirable to set separate thresholds for each dimension of the color space (such as red, green, and blue) used. Once again these separate thresholds may be automatically calculated or may be set by the user.

Other aspects and advantages of the present invention will become apparent from the following detailed description, taken in conjunction with the accompanying drawings, illustrating by way of example the principles of the invention.

DETAILED DESCRIPTION

Figure 1:
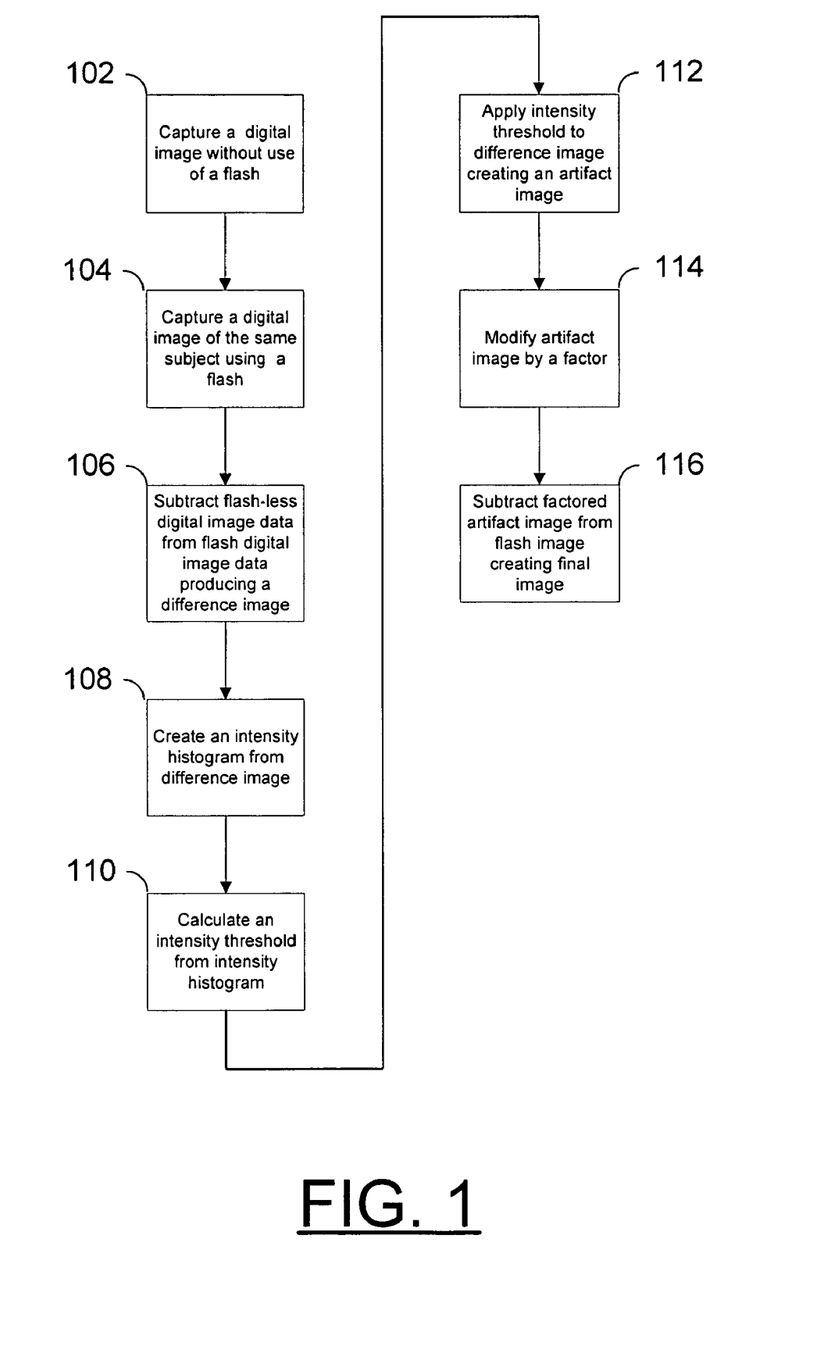
FIG. 1 is a flowchart of a process for removing flash artifacts from a pair of digital images.

FIG. 1 is a flowchart of a process for removing flash artifacts from a pair of digital images. In a step 102, a digital image is captured without the use of a flash. In a step 104, another digital image of the same subject is captured with the use of a flash. Note that it makes no difference in which order these two digital images are captured. However, it is desirable that the subject does not move between the capture of these two digital images. This may be accomplished by taking the two images in rapid succession. In a step 106, the flash-less digital image is subtracted from the flash digital image producing a difference image. In a black and white (gray scale) implementation of this invention, the digital images contain intensity data alone, and the difference image is a representation of the intensity changes in the image brought about by the use of the flash. In a step 108, an intensity histogram is generated from the difference image. This intensity histogram may have a shape similar to the example histogram of FIG. 2. From this intensity histogram, in a step 110, an intensity threshold is calculated. This intensity threshold is selected such that when applied to the difference image, in a step 112, only the overly bright reflections will be stored in the artifact image, and the desirable changes in intensity from the flash will no longer exist in the artifact image. If this threshold step (or a similar process) were not done, subtracting the artifact (equal to the difference image in this case) image from the flash image would simply generate the flash-less image. In some implementations of the present invention, it may be desirable to allow the user to set the intensity threshold, or it may be permanently configured within the digital image capture device, or it may be selected through the use of methods other than a histogram that produce similar intensity threshold results. In a step 112, the intensity threshold is applied to the difference image. All portions of the difference image with an intensity greater than the intensity threshold are stored in an artifact image. This artifact image now contains intensity differences for just those areas of the image where the intensity difference due to the use of the flash are greater than what is desired. In some implementations of the present invention, some processing of the artifact image may be done to modify the effect of the artifact removal. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. This processing of the artifact image, as shown in step 114, may be included in any or all of the implementations of the present invention described herein. In a step 116, the modified artifact image is subtracted from the flash image resulting in a final image with the flash artifacts removed or modified. Also note that this algorithm helps correct for artifacts caused by portions of the image being too close to the flash. If there are parts of the subject much closer to the flash than other parts of the subject, the close parts may be unreasonably brightly lit by the flash and this method may replace those washed out parts of the image with the non-flashed image data.

Figure 2:
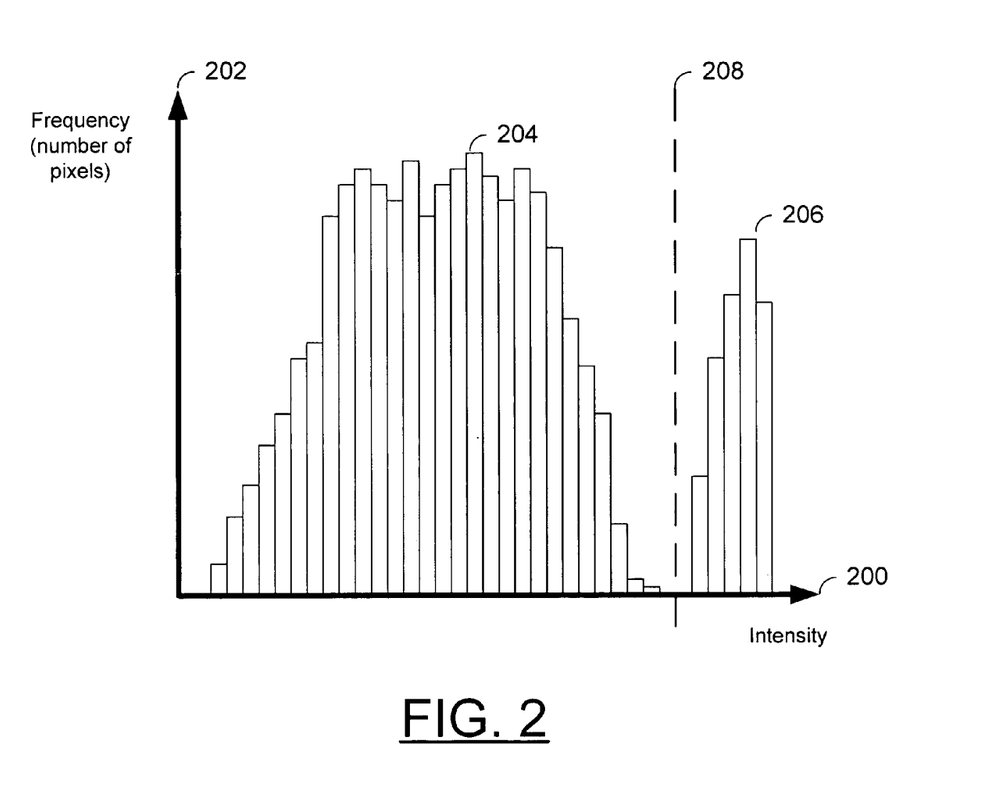
FIG. 2 is an example intensity histogram of an example difference image.

FIG. 2 is an example intensity histogram of an example difference image. In this histogram the x-axis 200 represents intensity and the y-axis 202 represents frequency measured in number of pixels. In a digital camera the possible intensities are quantized, so it is relatively easy to calculate how many pixels are represented by each possible intensity and produce a histogram similar to that shown in FIG. 2. In an example embodiment of the present invention using gray scale data, the gray scale image data simply contains the intensity of each pixel and a histogram may be made directly from this data. Also, in some color space models, such as the YIQ model used in commercial color television broadcasts within the United States, one axis of the color model may contain the intensity data, and this component alone of the color image data may be used to create the histogram. In the YIQ color model example, the Y-axis is luminance and this component of the color image data is used to create the histogram. The YIQ color model is used in television images transmitted according to the National Television System Committee (NTSC) standard. RGB color data may be converted to YIQ data using a standard mapping algorithm. For example, the formula to extract the luminance (Y in YIQ) from RGB color data is $Y=0.299R+0.587G+0.114B$. This calculated luminance (or intensity) can then be used by the present invention to detect and correct intensity variations due to flashes in color images. There are many different models of color space. The present invention will work properly for all of them as long as some method exists to extract intensity, luminance, or brightness from the color data. The example histogram of FIG. 2 shows two distinct lobes of intensity. First, there is a lower lobe 204, that represents all the pixels where the intensity difference between the flash image and the flash-less image are present, but not extreme. However, there is also an upper lobe 206, where the intensity difference between the flash image and the flash-less image are extreme. This upper lobe will contain pixels with specular reflection of the flash and possibly other flash artifacts. From this example histogram, an intensity threshold 208 may easily be selected at the frequency minimum between the two lobes. Thus, when the artifact image is created from the difference image, all of the pixels with intensities less than the intensity threshold 208, have their intensity difference set to 0. Then, the pixels with intensities greater than the intensity threshold 208, have their intensity differences left as they were in the difference image. Note that some images may not have a nice easy bimodal distribution of intensity values as shown in this figure. In such a case, the intensity threshold will have to be chosen by a method other than looking for a local minimum of the data. For example, the method may default to a set threshold when no local minimum exists, or it may be set at a percentage of the maximum intensity difference, or it may be set such that a certain percentage of the pixels are above the threshold.

Figure 3:
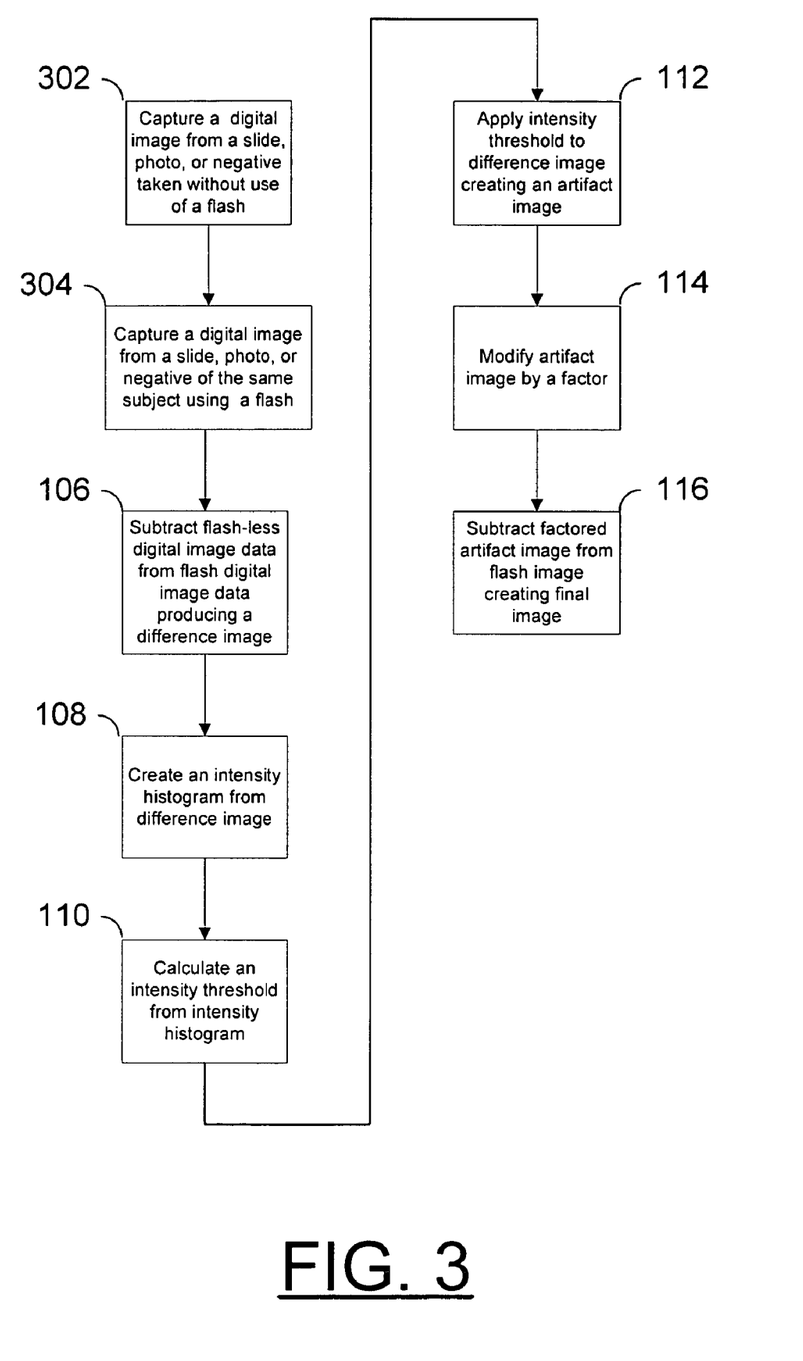
FIG. 3 is a flowchart of a process for removing flash artifacts from a pair of photographic slides, prints, or negatives.

FIG. 3 is a flowchart of a process for removing flash artifacts from a pair of photographic slides, prints, or negatives. In this example embodiment of the present invention, the process of removing flash artifacts starts with two non-digital images; one taken with a flash, and the other taken without a flash. Then, digital images are created of both non-digital images, for example, through the use of a scanner. This process is very similar to that described in FIG. 1 with two exceptions. First, in a step 302, the flash-less digital image is captured from a flash-less slide, print, or negative, instead of directly from a subject. Second, in a step 304, the flash digital image is captured from a slide, print, or negative taken with the use of a flash, instead of directly from a subject. The rest of the process follows the steps of the process described in FIG. 1. In a step 106, the flash-less digital image is subtracted from the flash digital image producing a difference image. In a black and white (gray scale) implementation of this invention, the digital images contain intensity data alone, and the difference image is a representation of the intensity changes in the image brought about by the use of the flash. In a step 108, an intensity histogram is generated from the difference image. This intensity histogram may have a shape similar to the example histogram of FIG. 2. From this intensity histogram, in a step 110, an intensity threshold is calculated. This intensity threshold is selected such that when applied to the difference image, in a step 112, only the overly bright reflections will be stored in the artifact image, and the desirable changes in intensity from the flash will no longer exist in the artifact image. If this threshold step (or a similar process) were not done, subtracting the artifact image from the flash image would simply generate the flash-less image. In some implementations of the present invention, it may be desirable to allow the user to set the intensity threshold, or it may be permanently configured within the digital image capture device, or it may be selected through the use of methods other than a histogram that produce similar intensity threshold results. In a step 112, the intensity threshold is applied to the difference image. All portions of the difference image with an intensity greater than the intensity threshold are stored in an artifact image. This artifact image now contains intensity differences for just those areas of the image where the intensity difference due to the use of the flash are greater than what is desired. In some implementations of the present invention, some processing of the artifact image may be done to modify the effect of the artifact removal. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. This processing of the artifact image, as shown in step 114, may be included in any or all of the implementations of the present invention described herein. In a step 116, the modified artifact image is subtracted from the flash image resulting in a final image with the flash artifacts removed or modified.

Figure 4:
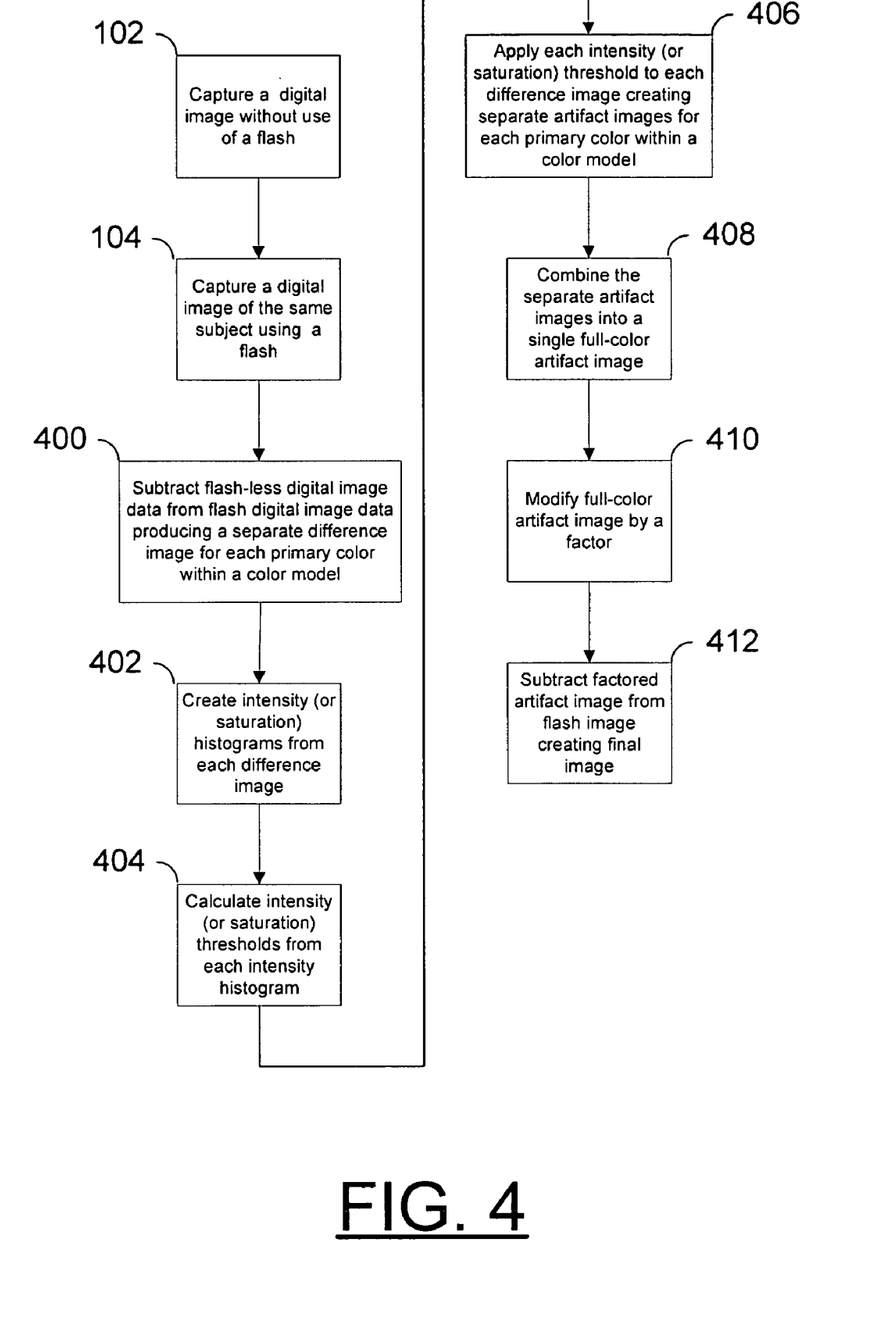
FIG. 4 is a flowchart of a process for removing flash artifacts from a pair of digital images.

FIG. 4 is a flowchart of a process for removing flash artifacts from a pair of digital images. In this example embodiment of the present invention, color digital images are processed, and separate intensity thresholds 208 are calculated for each of the three primary colors within a color space. For example, many digital image capture devices use the red/green/blue (RGB) color space model comprising the three primary colors of red, green, and blue. In the RGB example, separate difference images would be created for each of the primary colors, and separate thresholds would be calculated for each of the primary colors. In this example, the method is applied to each of the primary colors and will remove artifacts such as red eye where the subject's eyes reflect back as a bright red color from the flash. In the case of red eye, the magnitude of the red component of the image will show a large increase in the area of the subject's eyes and this will be detected and removed or modified by the method. Many other color space models exist and are compatible with the present invention. In the RGB color space model, each of the three primary colors (red, green, and blue) is represented by one axis of the three-dimensional color space model. In contrast, in a hue/saturation/value (HSV) color space model the hue and saturation data define the shade of color and the value represents the intensity of the color. In a HSV color space model, the value data (the V in HSV) is used directly to determine the intensity threshold, whether by use of a histogram or another method. This process starts similar to the process described in FIG. 1. In a step 102, a digital image is captured without the use of a flash. In a step 104, another digital image of the same subject is captured with the use of a flash. Note that it makes no difference in which order these two digital images are captured. However, it is desirable that the subject does not move between the capture of these two digital images. This may be accomplished by taking the two images in rapid succession. In a step 400, separate difference images for each primary color (or axis of color space model) are calculated by subtracting the flash-less digital images from the flash digital image. For example, in an RGB color space, the two digital images are stored as separate red, green, and blue digital images. The red digital image contains data for the primary color red. Likewise, the green and blue digital images contain data for the primary colors green and blue. The red flash-less digital image is subtracted from the red flash image producing a red difference image. Likewise, the green and blue flash-less images are subtracted from the green and blue flash images producing green and blue difference images. In a step 402, histograms are created for each of these red, green and blue difference images. Note that in some color space models, such as the HSV model discussed above, there may only be one histogram generated. In these color space models where only one histogram is generated, the present method will serve to correct variations in intensity, but will not detect color shifts unless the image data is converted to a color space model, such as RGB, where data for each primary color is available. In a step 404, three thresholds 208 are calculated for each of the three difference images using a process similar to that from the detailed description of FIG. 2. In a step 406, each threshold 208 is applied to its corresponding difference image, producing three artifact images for the primary colors of the color space. Note that this step results in an additional function of the present invention, the correction of color shifts due to a flash. For example, if the red channel shows a large increase in magnitude, but the blue and green remain relatively unchanged, this represents a red color shift in that portion of the image. In embodiments of the present invention using a single intensity histogram, this color shift may remain uncorrected. By processing each channel separately, color shifts without an accompanying intensity shift may be detected and corrected. In a step 408, the three primary color artifact images are combined into a full color artifact image. In some implementations of the present invention, some processing of the artifact image may be done to modify the effect of the artifact removal. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. This processing of the artifact image, as shown in step 410, may be included in any or all of the implementations of the present invention described herein. Finally, in a step 412, the full color artifact image is subtracted from the full color flash image producing a full color final image.

Figure 5:
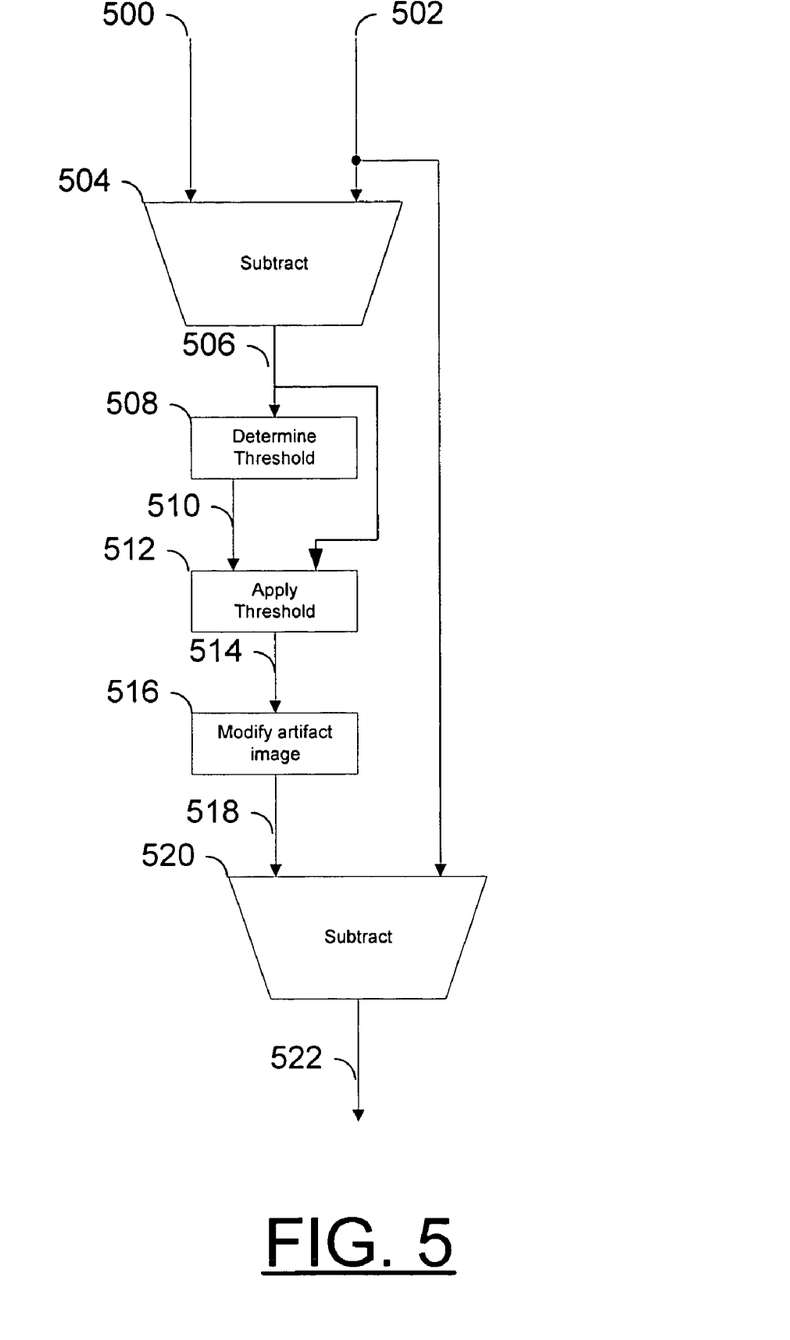
FIG. 5 is a block diagram of a device for removing flash artifacts from a pair of digital images.

FIG. 5 is a block diagram of a device for removing flash artifacts from a pair of digital images. In this example embodiment of the present invention, it is assumed that both flash-less and flash digital image data is available at the inputs to the device. This image data may be captured by an image capture device as described in the detailed descriptions for FIG. 1 and FIG. 4, or alternatively may come from existing slides, prints, or negatives as described in the detailed description for FIG. 3. Flash-less digital image data 500 is subtracted from flash digital image data 502, in a first subtract block 504 resulting in difference digital image data 506. This difference digital image data 506 is then used to calculate an intensity threshold 510 in a threshold block 508. The intensity threshold 510 may be calculated through the use of a histogram as described in the detailed description for FIG. 2. Note that in a gray scale system, the gray scale data is intensity data and the difference image data is the used directly in calculating an intensity threshold 510. Alternative methods for determining the intensity threshold 510 such as a pre-set value, or user input, or other similar methods that are within the scope of the present invention. In a clipping block 512 all of the pixels in the difference digital image data 506 having an intensity less than the intensity threshold 510 are set to an intensity level of zero. This clipping block 512 produces the artifact image 514. In some implementations of the present invention, some processing of the artifact image may be done to modify the effect of the artifact removal. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. This processing of the artifact image, as performed in the modification block 516, may be included in any or all of the implementations of the present invention described herein. The modified artifact image 518 is then subtracted from the flash digital image 502 in a second subtract block 520, producing the final flash-artifact-free image 522. In another example embodiment of the present invention, this process shown in FIG. 5 may be applied on a pixel-by-pixel basis. This type of embodiment is shown in FIG. 7 and described below.

Figure 6:
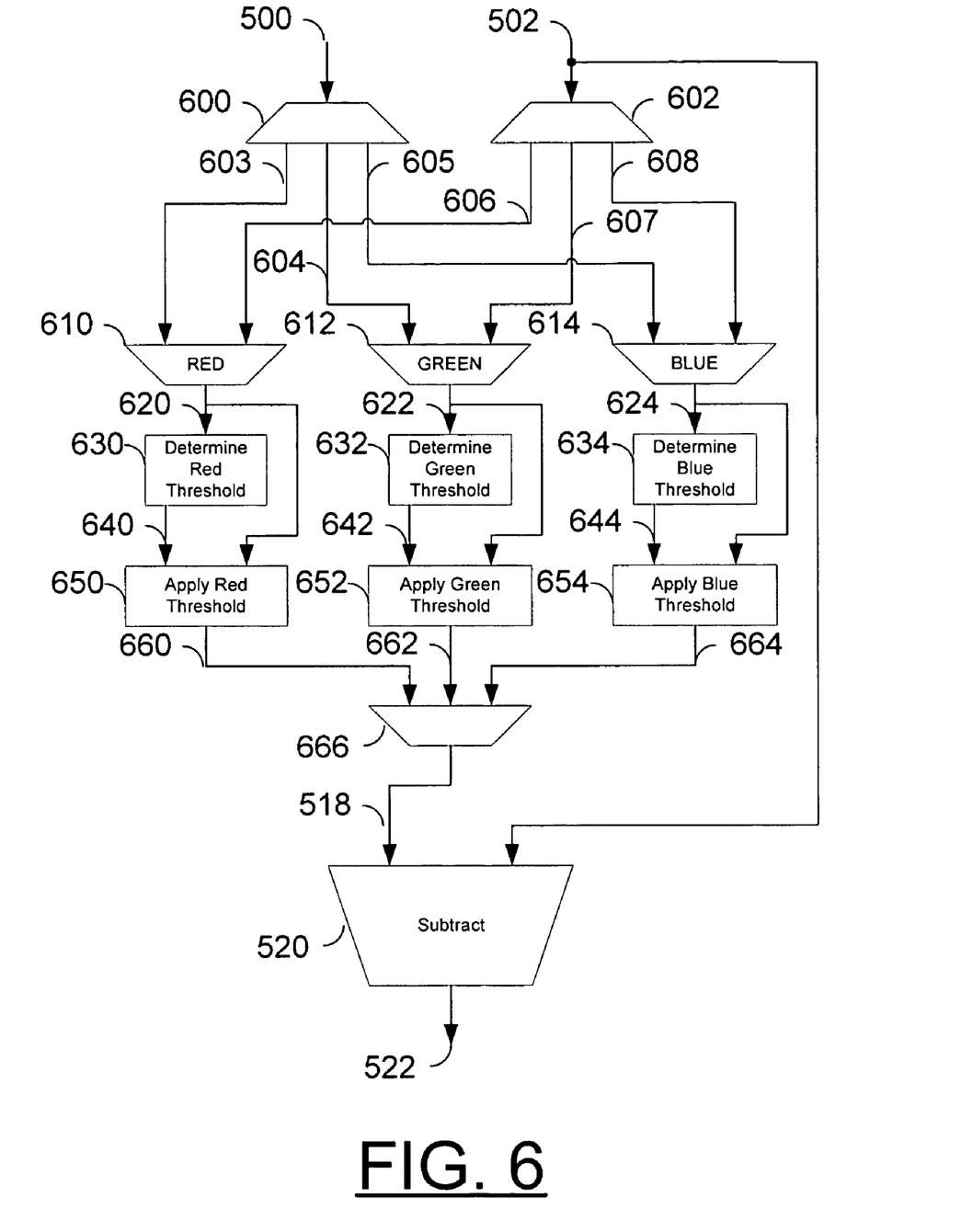
FIG. 6 is a block diagram of a device similar to that of FIG. 5 where each primary color is treated independently.

FIG. 6 is a block diagram of a device similar to that of FIG. 5 where each primary color is treated independently. In this example embodiment of the present invention, it is assumed that both flash-less and flash digital image data are available at the inputs to the device. This image data may be captured by an image capture device as described in the detailed descriptions for FIG. 1 and FIG. 4, or alternatively may come from existing slides, prints, or negatives as described in the detailed description for FIG. 3. Flash-less digital image data 500 enters the device at a flash-less split block 600 where the image data is separated into color data for each primary color in the current color space. Flash digital image data 502 enters the device at a flash split block 602 where the image data is separated into color data for each primary color in the current color space. In this example embodiment of the present invention, an RGB color space is used and each primary color has a magnitude (instead of an intensity value). In other embodiments of the present invention, other color spaces such as Cyan/Magenta/Yellow (CMY) may be used instead of the RGB color space shown here. Note that some other color spaces may contain intensity data instead of saturation or magnitude data and the present invention is designed to work in either manner. Color spaces, such as HSV, where there are no separate primary colors, will allow use of the present method to detect and correct variations in intensity due to a flash. However, unless the data is converted to a color space model with primary colors (such as RGB or CMY), shifts in color due to the flash will not be detected. In this example embodiment, the flash-less split block 600 separates the flash-less digital image data into flash-less red data 603, flash-less green data 604, and flash-less blue data 605. Likewise, the flash split block 602 separates the flash digital image data into flash red data 606, flash green data 607, and flash blue data 608. In a first red subtraction block 610, the flash-less red data 603 is subtracted from the flash red data 606, producing red difference data 620. In a first green subtraction block 612, the flash-less green data 604 is subtracted from the flash green data 607, producing green difference data 622. In a first blue subtraction block 614, the flash-less blue data 605 is subtracted from the flash blue data 608, producing blue difference data 624. In a red threshold block 630 a red threshold 640 is determined using a histogram or other method. In a green threshold block 632 a green threshold 642 is determined using a histogram or other method. In a blue threshold block 634 a blue threshold 644 is determined using a histogram or other method. In a red clipping block 650 all of the pixels in the red difference data 620 having a value less than the red threshold 640 are set to a red saturation level of zero. This red clipping block 650 produces the red artifact image 660 that contains red difference data for all of the pixels within the image where the red difference due to the use of the flash is greater than desired. In a green clipping block 652 all of the pixels in the green difference data 622 having a value less than the green threshold 642 are set to a green level of zero. This green clipping block 652 produces the green artifact image 662 that contains green difference data for all of the pixels within the image where the green difference due to the use of the flash is greater than desired. In a blue clipping block 654 all of the pixels in the blue difference data 624 having a value less than the blue threshold 644 are set to a blue level of zero. This blue clipping block 654 produces the blue artifact image 664 that contains blue difference data for all of the pixels within the image where the blue difference due to the use of the flash is greater than desired. In an artifact combination block 666, the red artifact image 660, green artifact image 662, and blue artifact image 664 are combined to produce a full-color artifact image 514. In some implementations of the present invention, some processing of the artifact image may be included within the combination block 666 to modify the effect of the artifact removal. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. This full-color artifact image 518 is then subtracted from the flash digital image 502 in a second subtract block 520, producing the final flash-artifact-free image 522. It is also possible to create an embodiment of the present invention in a system that uses more than three primary colors. The additional primary colors may act to expand the range of the color space beyond the area covered by, for example, a red/green/blue color space and may be treated within the present invention as another primary color. While the additional primary colors may not be necessary in many implementations, the present invention still allows their use in removal of flash artifacts. Thus, while three (red, green, and blue) color pipelines are shown in FIG. 6 and FIG. 7 there may be additional pipelines present as needed by some implementations of the present invention.

Figure 7:
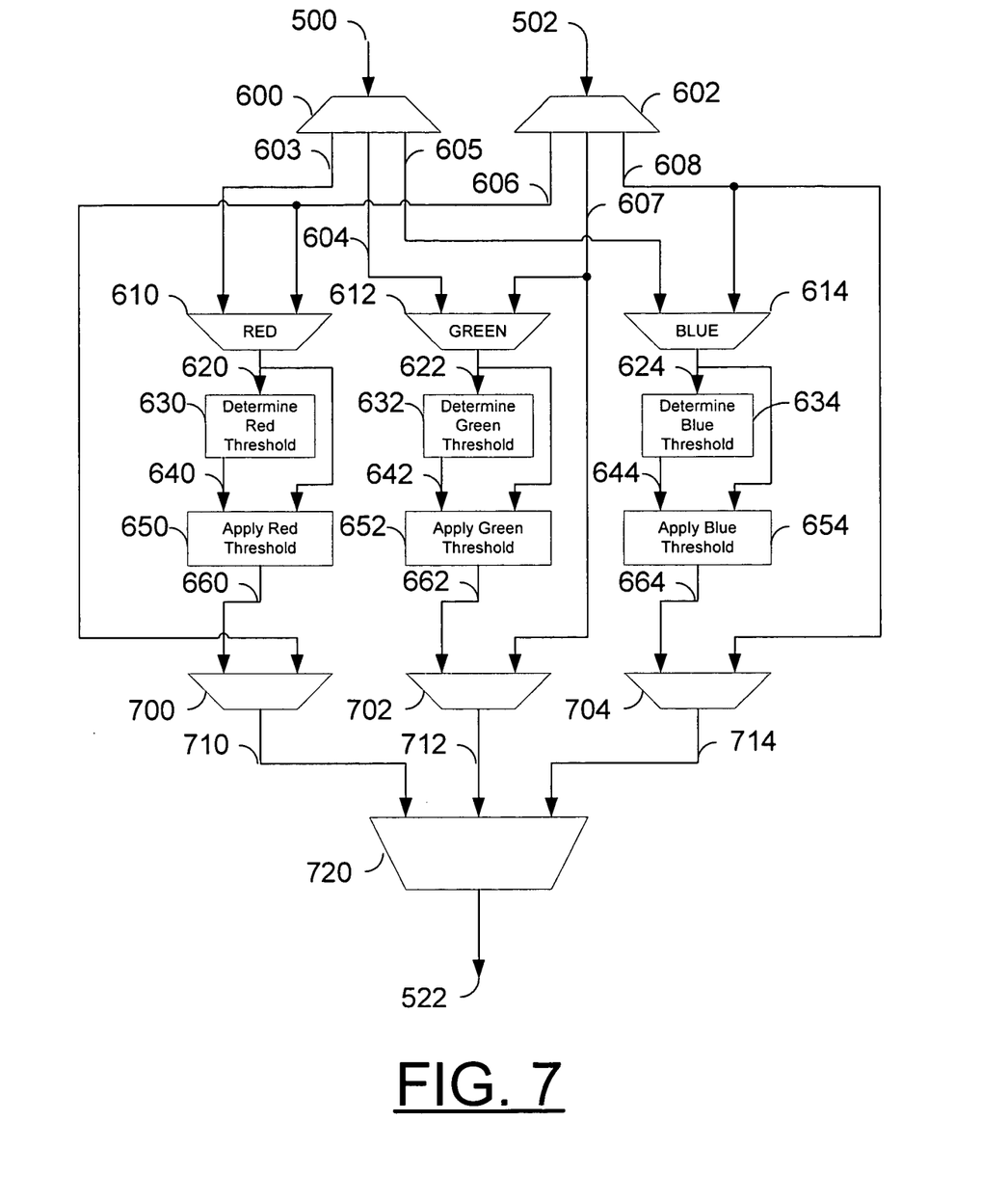
FIG. 7 is a block diagram of a device similar to that of FIG. 6 wherein the artifact image for each primary color is subtracted from the flash image for each primary color before the primary colors are combined to produce a full-color image.

FIG. 7 is a block diagram of a device similar to that of FIG. 6 wherein the artifact image for each primary color is subtracted from the flash image for each primary color before the primary colors are combined to produce a full-color image. In this example embodiment of the present invention, it is assumed that both flash-less and flash digital image data are available at the inputs to the device. This image data may be captured by an image capture device as described in the detailed descriptions for FIG. 1 and FIG. 4, or alternatively may come from existing slides, prints, or negatives as described in the detailed description for FIG. 3. Flash-less digital image data 500 enters the device at a flash-less split block 600 where the image data is separated into color data for each primary color in the current color space. Flash digital image data 502 enters the device at a flash split block 602 where the image data is separated into color data for each primary color in the current color space. In this example embodiment of the present invention, an RGB color space is used and each primary color has a color value (instead of an intensity value). In other embodiments of the present invention, other color spaces such as Cyan/Magenta/Yellow (CMY) may be used instead of the RGB color space shown here. Note that some other color spaces may contain intensity data instead of saturation or magnitude data and the present invention is designed to work in either manner. Color spaces, such as HSV, where there are no separate primary colors, will allow use of the present method to detect and correct variations in intensity due to a flash. However, unless the data is converted to a color space model with primary colors (such as RGB or CMY), shifts in color due to the flash will not be detected. In this example embodiment the flash-less split block 600 separates the flash-less digital image data into flash-less red data 603, flash-less green data 604, and flash-less blue data 605. Likewise, the flash split block 602 separates the flash digital image data into flash red data 606, flash green data 607, and flash blue data 608. In a first red subtraction block 610, the flash-less red data 603 is subtracted from the flash red data 606, producing red difference data 620. In a first green subtraction block 612, the flash-less green data 604 is subtracted from the flash green data 607, producing green difference data 622. In a first blue subtraction block 614, the flash-less blue data 605 is subtracted from the flash blue data 608, producing blue difference data 624. In a red threshold block 630 a red threshold 640 is determined using a histogram or other method. In a green threshold block 632 a green threshold 642 is determined using a histogram or other method. In a blue threshold block 634 a blue threshold 644 is determined using a histogram or other method. In a red clipping block 650 all of the pixels in the red difference data 620 having a value less than the red threshold 640 are set to a red level of zero. This red clipping block 650 produces the red artifact image 660 that contains red difference data for all of the pixels within the image where the red difference due to the use of the flash is greater than desired. In a green clipping block 652 all of the pixels in the green difference data 622 having a value less than the green threshold 642 are set to a green level of zero. This green clipping block 652 produces the green artifact image 662 that contains green difference data for all of the pixels within the image where the green difference due to the use of the flash is greater than desired. In a blue clipping block 654 all of the pixels in the blue difference data 624 having a value less than the blue threshold 644 are set to a blue level of zero. This blue clipping block 654 produces the blue artifact image 664 that contains blue difference data for all of the pixels within the image where the blue difference due to the use of the flash is greater than desired. In some implementations of the present invention, some processing of the artifact images may be included within the clipping blocks 650, 652, and 654, or the second subtract blocks 700, 702, and 704, to modify the effect of the artifact removal. Alternatively, separate modification blocks may be included between the clipping blocks 650, 652, and 654, and the second subtract blocks 700, 702, and 704. For example, it may not be desirable to completely remove the strobe artifact, but to remove a fraction of the brightness difference instead of the entire difference. The artifact image may be reduced by a factor, or it may be offset by a factor, either of which may be controlled by a user. Note that when no modification of the artifact image is desired, the multiplicative factor may be set to 1.0 or the additive factor may be set to 0.0 resulting in no change to the artifact image. In a second red subtract block 700, the red artifact image 660 is subtracted from the flash red data 606 to produce the red final image 710. In a second green subtract block 702, the green artifact image 662 is subtracted from the flash green data 607 to produce the green final image 712. In a second blue subtract block 704, the blue artifact image 664 is subtracted from the flash blue data 608 to produce the blue final image 714. In a final combination block 720, the red final image 710, and the green final image 712, are combined with the blue final image 714 to produce the full-color final image 522. It is also possible to create an embodiment of the present invention in a system that uses more than three primary colors. The additional primary colors may act to expand the range of the color space beyond the area covered by, for example, a red/green/blue color space and may be treated within the present invention as another primary color. While the additional primary colors may not be necessary in many implementations, the present invention still allows their use in removal of flash artifacts. Thus, while three (red, green, and blue) color pipelines are shown in FIG. 6 and FIG. 7 there may be additional pipelines present as needed by some implementations of the present invention.

Figure 8:
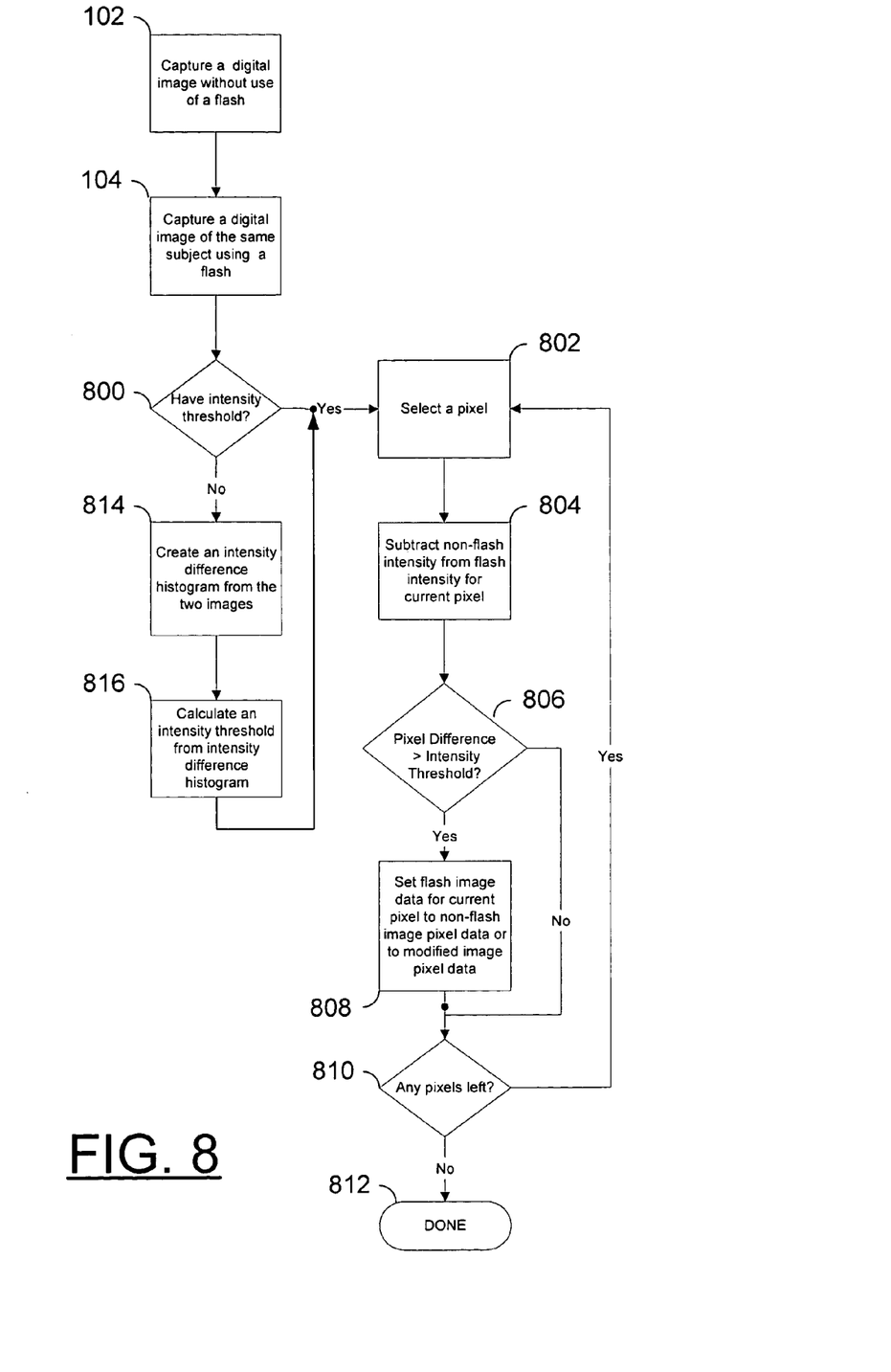
FIG. 8 is a flow chart of a method for removing flash artifacts from a pair of digital images on a pixel-by-pixel basis.

FIG. 8 is a flow chart of a method for removing flash artifacts from a pair of digital images on a pixel-by-pixel basis. The example embodiment shown in FIG. 8 is similar to that shown in FIG. 1, however the intensity calculations are done on a pixel-by-pixel basis. Note that while FIG. 8 shows a method including capturing two digital images, an alternate embodiment of this method may capture images from slides, photos, or negatives as described in FIG. 3. In a step 102, a digital image is captured without the use of a flash. In a step 104, another digital image of the same subject is captured with the use of a flash. Note that it makes no difference in which order these two digital images are captured. However, it is desirable that the subject does not move between the capture of these two digital images. This may be accomplished by taking the two images in rapid succession. In a decision step 800, if no intensity threshold currently exists, a threshold may be calculated and control passes to step 814 where the calculation is started. If an intensity threshold exists (possibly calculated earlier or set by a user) control passes to a step 802 where the pixel-by-pixel calculations begin. In a step 814, an intensity difference histogram is created by subtracting the intensity data of the flash-less digital image from the intensity data of the flash digital image on a pixel-by-pixel basis. Since the difference data is calculated on a pixel-by-pixel basis simply for the creation of a histogram, there is no need to retain the difference data for the entire image in a difference image. This intensity difference histogram may have a shape similar to the example histogram of FIG. 2. Once the histogram is completed, in a step 816, an intensity threshold is calculated from the intensity difference histogram and control passes to a step 802 where the pixel-by-pixel calculations begin. In a step 802, a pixel is selected. In a step 804, the non-flash image intensity for the selected pixel is subtracted from the flash image intensity for the selected pixel resulting in a pixel difference. In a decision step 806, if the pixel difference is greater than the intensity threshold control is passed to a step 808 where the flash image data for the current pixel is overwritten by the non-flash image data for the current pixel, and control passes to another decision step 810. Note that other embodiments of the present invention may modify the flash image data for the current pixel by methods other than overwriting it by the non-flash image data. For example, an average of the flash and non-flash data may be used instead so that the area benefits from some of the brightening from the flash, but is less intense than the flash data. This is similar to the offset or factoring of the artifact data in other embodiments of the present invention described herein. In the decision step 806, if the pixel difference is not greater than the intensity threshold, control is passed directly to the decision step 810 where the method determines if any pixels remain for calculation. If no pixels remain, control is passed to a finish step 812 where the process finishes and the final corrected flash image may then be stored. If pixels remain for calculation, control is passed back to a step 802 where another pixel is selected. Note that in some possible embodiments of the present invention it may not be necessary to run this process for each pixel in the image. In such cases the pixel selection step 802 may include sub-steps that insure that any pixels selected fall within the portion of the image selected for processing. Also note that in the example embodiment described above, a pixel difference greater than the intensity threshold is required to correct the image data for the current pixel. Other equivalent embodiments may check for a pixel difference greater than or equal to the intensity threshold. This is equivalent to decreasing the intensity threshold by one intensity unit. Further, note that the example embodiment of the present invention described in FIG. 8 will work equally well with color or gray scale data. Also, as shown in FIG. 6 and FIG. 7, the method shown in FIG. 8 may be performed on individual axes of a color model either by running each axis separately, or by performing the operations in parallel.

By performing the calculations on a pixel-by-pixel basis as described above, substantial savings in memory may be obtained. Note that this implementation does not require creation of a difference image, an artifact image, or of an additional final image. The artifact image data is calculated pixel-by-pixel and only used to determine whether or not to overwrite the flash image data for the current pixel with the non-flash image data for the current pixel. Thus, the flash image is selectively overwritten to become the final image, so that a final image in addition to the flash image is not needed. Also, note that if it is desired to preserve the flash image (perhaps for later calculations) a final image may be created by selectively writing either non-flash or flash image pixel data to a separate region of memory creating an additional final image.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for removing flash artifacts comprising the steps of:
   a) capturing a first digital image of a subject;
   b) capturing a second digital image of said subject with the use of a flash;
   c) selecting an intensity threshold; and
   d) for each pixel to be processed performing the sub-steps of:
      i) subtracting intensity of current pixel in said first digital image from intensity of current pixel in said second digital image resulting in a pixel to difference; and
      ii) replacing current pixel in said second digital image with current pixel from said first digital image when said pixel difference is greater than said intensity threshold.

2. A method for removing flash artifacts as recited in claim 1, wherein said intensity threshold is set by a user.

3. A method for removing flash artifacts as recited in claim 1, further comprising the step of:
   e) after all of said pixels to be processed have been processed, saving said second digital image in a memory device as a final digital image.

4. A method for removing flash artifacts comprising the steps of:
   a) capturing a first digital image of a subject;
   b) capturing a second digital image of said subject with the use of a flash;
   c) selecting at least three primary color thresholds; and
   d) for each primary color of each pixel to be processed performing the sub-steps of:
      i) subtracting primary color value of current pixel in said first digital image from primary color value of current pixel in said second digital image resulting in a primary color pixel difference for the current primary color of the current pixel; and
      ii) replacing primary color value of current pixel in said second digital image with primary color value of current pixel form said first digital image when said primary color pixel difference for the current primary color of the current pixel is greater than said primary color threshold for said current primary color.

5. A method for removing flash artifacts as recited in claim 4;
   wherein said primary colors include red, green, and blue.

6. A method for removing flash artifacts as recited in claim 4;
   wherein said primary colors include yellow, cyan, and magenta.

7. A method for removing flash artifacts as recited in claim 4;
   wherein said primary color thresholds are set by a user.

8. A method for removing flash artifacts as recited in claim 4, further comprising the step of:
   e) after all of said pixels to be processed have been processed, saving said second digital image in a memory device as a final digital image.

9. A method for removing flash artifacts comprising the steps of:
   a) capturing a first digital image of a subject;
   b) capturing a second digital image of said subject with the use of a flash;
   c) selecting at least three primary color thresholds; and
   d) for each primary color of each pixel to be processed performing the sub-steps of:
      i) subtracting primary color value of current pixel in said first digital image from primary color value of current pixel in said second digital image resulting in a primary color pixel difference for the current primary color of the current pixel; and
      ii) replacing primary color value of current pixel in said second digital image with a color value calculated from said primary color value of current pixel in said first digital image, and said primary color value of current pixel in said second digital image, when said primary color pixel difference for the current primary color of the current pixel is greater than said primary color threshold for said current primary color.

10. A method for removing flash artifacts as recited in claim 9;
    wherein said primary colors include red, green, and blue.

11. A method for removing flash artifacts as recited in claim 9;
    wherein said primary colors include yellow, cyan, and magenta.

12. A method for removing flash artifacts as recited in claim 9;
    wherein said primary color thresholds are set by a user.

13. A method for removing flash artifacts as recited in claim 9, further comprising the step of:
    j) after all of said pixels to be processed have been processed, saving said second digital image in a memory device as a final digital image.

* * * * *

UNITED STATES PATENT AND TRADEMARK OFFICE
CERTIFICATE OF CORRECTION

| | |
|---|---|
| PATENT NO. | : 7,027,662 B2 |
| APPLICATION NO. | : 11/011412 |
| DATED | : April 11, 2006 |
| INVENTOR(S) | : John M. Baron |

It is certified that error appears in the above-identified patent and that said Letters Patent is hereby corrected as shown below:

In column 11, line 40, in Claim 1, after "pixel" delete "to".

In column 12, line 6, in Claim 4, delete "form" and insert -- from --, therefor.

Signed and Sealed this

Twenty-third Day of June, 2009

JOHN DOLL
*Acting Director of the United States Patent and Trademark Office*